United States Patent [19]

Saggese

[11] Patent Number: 4,476,374

[45] Date of Patent: Oct. 9, 1984

[54] ROTARY INDEXING LASER MIRROR APPARATUS

[75] Inventor: Joseph P. Saggese, Melrose, Mass.

[73] Assignee: Avco Everett Research Laboratory, Inc., Everett, Mass.

[21] Appl. No.: 460,157

[22] Filed: Jan. 24, 1983

[51] Int. Cl.$^3$ .............................................. B23K 27/00
[52] U.S. Cl. ...................... 219/121 LB; 219/121 LU; 219/121 LQ
[58] Field of Search .................. 219/121 LA, 121 LB, 219/121 LQ, 121 LU, 121 LY, 121 L, 121 LM

[56] References Cited

U.S. PATENT DOCUMENTS

| | | | |
|---|---|---|---|
| 3,131,456 | 5/1964 | Bryant | 29/38 C |
| 3,336,823 | 8/1967 | Bonzi | 408/71 |
| 4,050,355 | 9/1977 | Niskanen | 409/221 |

*Primary Examiner*—C. L. Albritton
*Attorney, Agent, or Firm*—M. E. Frederick; David L. Smith

[57] ABSTRACT

A rotary indexing device for indexing a member, such as a shaft, into operative working positions in which the shaft carries a plurality of indexing arms for selecting different working positions. Final positioning means for each indexing arm comprising a solenoid actuated, pneumatic operated pin for engaging the indexing arm and effects final adjustment of the indexing arm which is brought to approximately its proper position by a servo-motor. Means are also provided to provide positive confirmation that each step of the indexing operation has been properly completed to insure that the shaft has been rotated to and is in its proper position.

7 Claims, 4 Drawing Figures

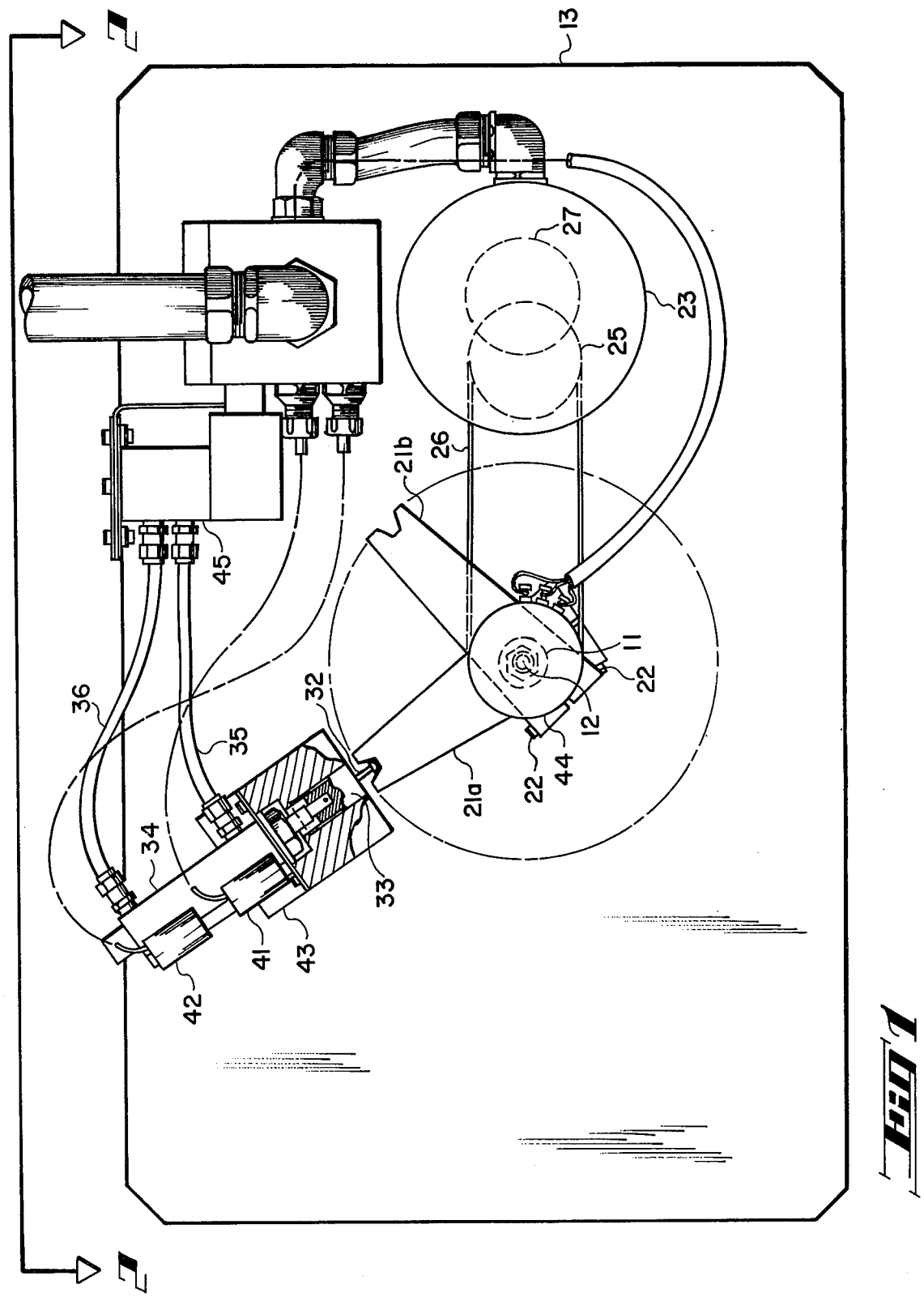

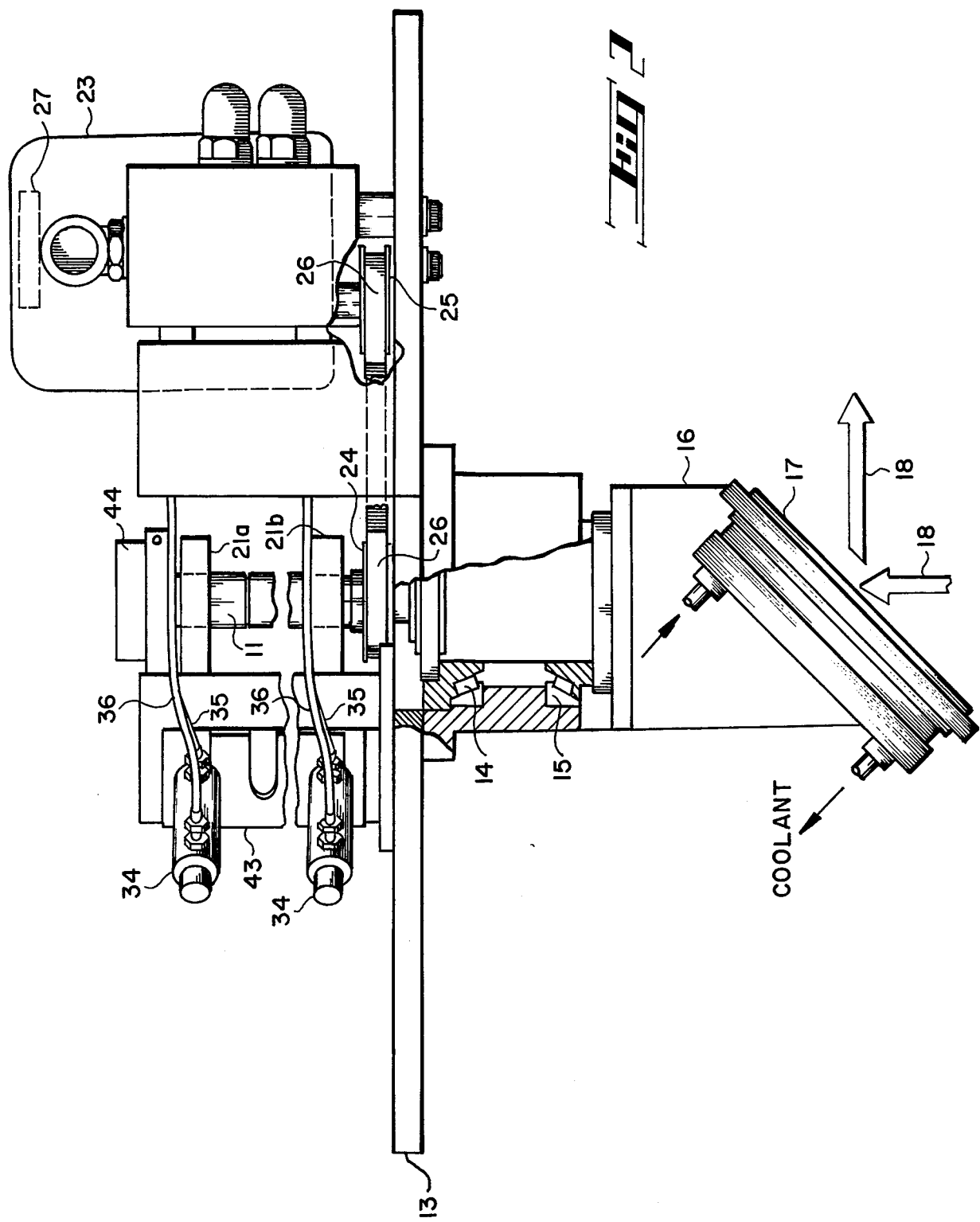

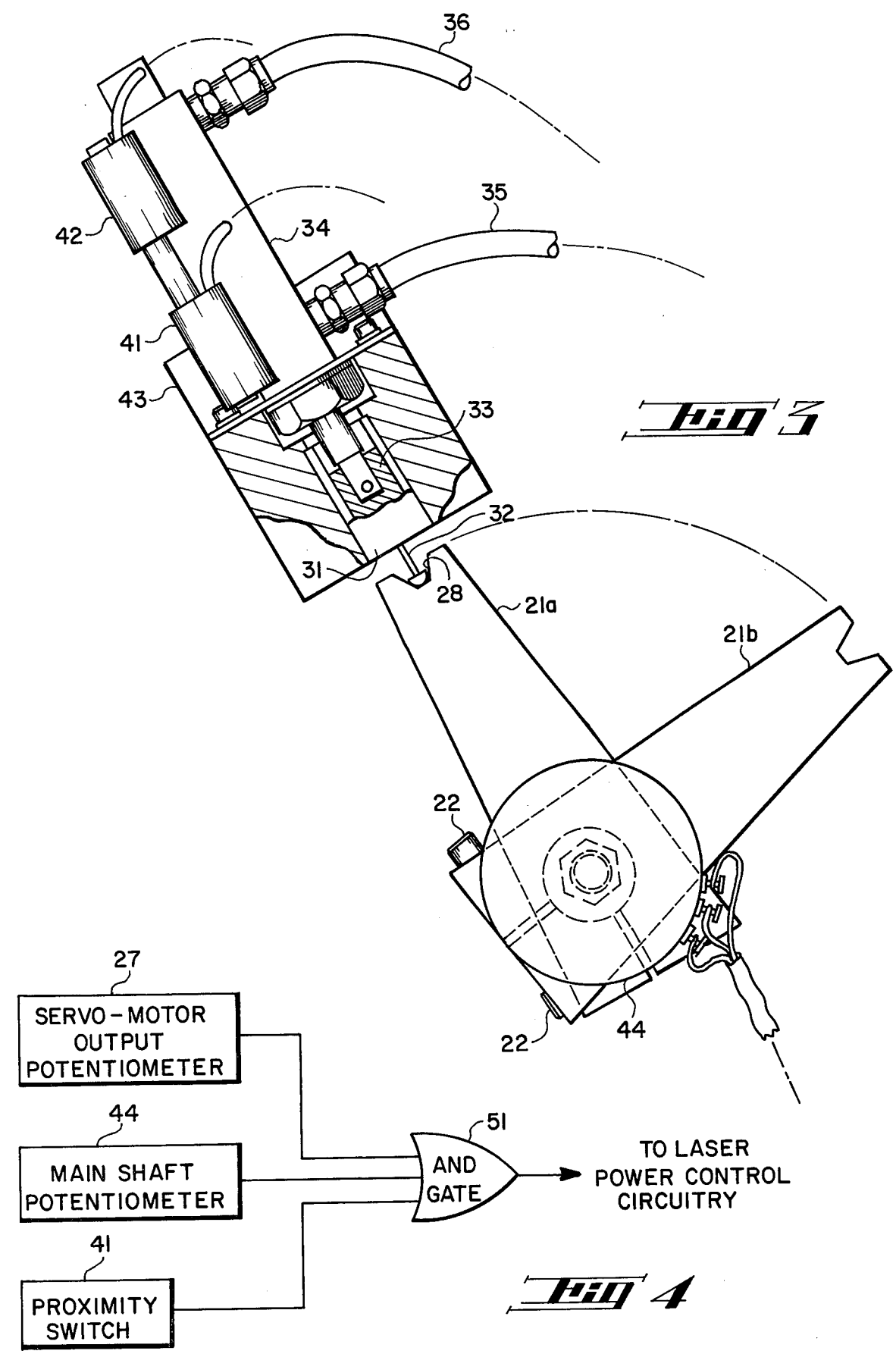

ROTARY INDEXING LASER MIRROR APPARATUS

This invention relates to rotary indexing apparatus and, more particularly, to apparatus for accurately and repeatedly indexing a laser beam directing mirror.

Indexing devices of various types are known for indexing work tables, shafts and the like, but involve certain drawbacks, either in the form of high cost, lack of a high degree of repeatable accuracy, and inability to positively indicate achievement of each desired indexing.

Very high power lasers are commercially available that have beam powers in excess of twenty kilowatts and it is often desired that the laser beam from such lasers be directed to different work stations at distances of sixty feet or more from the laser.

Since very high power lasers of the above-noted type produce extremely powerful laser beams which, in microseconds, can cause serious injury or damage if misdirected, it is of utmost importance that sequential direction of such laser beams be accomplished precisely and safely each time, and that the operator have positive confirmation that this has been accomplished. Thus, not only positive controls must be employed to insure repeatable precise indexing of the laser beam directing mirror, but there must be positive confirmation that each of the steps involved in the indexing operation has been properly completed to thereby insure that the laser beam directing mirror is in its proper position.

If the laser beam directing mirror is not properly indexed, not only can this result in damage to tools and apparatus being used, but personnel can suffer great injury.

With the foregoing in mind, a primary objective of the present invention is the provision of an indexing mechanism for indexing a shaft which avoids the drawbacks noted above.

BRIEF SUMMARY OF THE INVENTION

While it is not to be so limited, the present invention was developed to permit very accurate and repeatable indexing and confirmation of such indexing of a mirror for direction a high power laser beam over long distances to different optical systems for directing the laser beam to different work stations, and will be so described herein for convenience and by way of example.

In accordance with the present invention, a plurality of indexing arms are adjustably carried on a rotatable main shaft to which may be attached a laser beam directing mirror, work table or the like. A servo-motor causes the main shaft to rotate and be indexed to approximately the correct position. This approximate positioning by the servo-motor will preferably be such as to bring the axis of the laser beam reflected from a mirror carried by the main shaft to within a few thousandths of an inch of each of its design positions. After the main shaft and, hence, appropriate indexing arm (there is one for each indexing position or work station) reaches its approximate position as noted above, a solenoid actuated pneumatic switch is actuated which in turn actuates a plunger. Actuation of the plunger causes an appropriately-shaped indexing pin to enter and be held in a conical recess provided at the tip of the appropriate indexing arm. The actuation of the indexing pin effects a fine and final adjustment of the location of the main shaft to precisely orientate and lock in position the main shaft and, hence, laser beam directing mirror to precisely direct the high power laser beam to the optical system for conducting the laser beam to the desired work station which may be only one of many. A separate solenoid actuated pneumatic switch, plunger and pin are provided for each indexing arm.

An output signal from the servo-motor is generated to confirm that the servo-motor operated, an output signal from a potentiometer carried by the main shaft confirms that the main shaft rotated, the output signal from a first switch confirms that the correct plunger was actuated, and a second switch confirms that the indexing pin of this plunger is in its proper actuated position in its recess in the appropriate indexing arm.

The exact nature of the present invention will become more clearly apparent upon reference to the following detailed specification taken in connection with the accompanying drawings in which:

FIG. 1 is a top plan view of rotary indexing apparatus according to the present invention.

FIG. 2 is a side elevational view of that shown in FIG. 1 taken on line 2—2.

FIG. 3 is a top view on an enlarged scale with parts broken away of an indexing arm and cooperating plunger apparatus.

FIG. 4 is a circuit diagram of a fail-safe circuit according to the present invention.

DETAILED DESCRIPTION OF THE INVENTION

Referring now to FIGS. 1 and 2, the reference numeral 11 indicates a main shaft rotatable about its central axis 12 and passing through a support table 13. Main shaft 11 is supported in and extends through suitable anti-friction bearings 14–15 which are carried by the support table 13. At the lower end of main shaft 11 as shown in FIG. 1, there is fixedly provided a mirror support member 16 for receiving, in the case of a laser beam indexing operation, a suitable mirror 17 for receiving the output beam 18 of a suitable laser (not shown) and directing it at the desired angle.

Main shaft 11 extends past the upper side of the support table 13 opposite to that of the mirror support member 16 and carries a plurality of outwardly extending, infinitely radially adjustable indexing arms 21a–b (only two are shown for convenience) disposed one above another. The indexing arms are all of the same length and may be keyed to fit a circumferential groove in the main shaft to prevent any axial movement up or down the shaft. The indexing arms may be further provided with clamping bolts 22 to permit radial adjustment when these bolts are loosened and to lock the indexing arms on the shaft when the clamping bolts are tightened.

Operatively associated with the main shaft is a suitable driving servo-motor 23 carried by the support table 13. The output shaft (not shown) of the servo-motor 23 is coupled to the shaft 11 through pulley wheels 24 and 25 and a drive belt 26. The servo-motor 23 may be of any conventional type such as a Foxboro-Jordan rotary actuator SMV630 that can selectably effect rotation through preselected angles and is provided internally with an output potentiometer 27 to provide an output signal indicative of rotation whenever its output shaft carrying pulley wheel 25 is rotated upon actuation of the motor.

Any number of indexing arms may be mounted on the main shaft 11 by making main shaft 11 of sufficient length to take the desired number of indexing arms, one for each position to which main shaft 11 (and, hence, mirror 17 or the like) is to be indexed. Only two indexing arms are shown for simplicity. Each indexing arm is suitably formed to be mounted on shaft 11 and to be locked in any desired radial position. This may be easily accomplished by forming the end to be carried by main shaft 11 in a generally U-shape whereby a clamping bolt 22 or the like may be used to squeeze the legs of the U together and thereby lock the indexing arm on the main shaft 11. The end of each indexing arm remote from shaft 11 is provided with a preferably cone shaped recess 28 to receive a pin 31, the extreme end 32 of which is preferably hemispherical in shape.

Pin 31 is carried at the extreme end of an extension 33 forming part of a pneumatically actuated plunger 34. The plunger 34 may be of conventional type wherein the application of pneumatic pressure at one end as by hose 35 causes the extension 33 to move in one direction and the application of pneumatic pressure, as by hose 36, causes the extension 33 to move in the opposite direction. Each plunger 34 is actuated through a separate solenoid actuated pneumatic switch 45 effective to supply pneumatic pressure to the appropriate hose coupled to the plunger. Also carried by plunger 34 are magnetically actuated proximity switches 41 and 42. Switch 41 is actuated when the extension 33 is extended such that pin 31 is disposed in its recess 32, thereby providing an indication that a given indexing arm is locked in position. Switch 42 is actuated when extension 33 has moved toward the indexing arm, but has not as yet reached its desired distance of travel to provide an indication that the plunger associated with a given indexing arm has been actuated. It will be obvious to those skilled in the art that means other than that shown and described herein may be used to effect final positioning and locking of the indexing arms and provide indications of a completed step.

A plunger and its associated components are provided for each indexing arm provided on main shaft 11. The plungers are most conveniently mounted on a supporting bracket 43 such that their pins 31 are each directly opposite the recess 28 in their associated indexing arms. The pins 31 do not need to be precisely oriented with respect to each other since, in each case, the main shaft 11 is rotated to its desired or necessary position, the appropriate indexing arm rotated and locked in position by its pin and then the indexing arm is locked to main shaft 11.

At the upper end of shaft 11 is provided a potentiometer 44 that provides a signal indicative of the radial position or movement of shaft 11.

In use, for each desired indexed position of the main shaft, which is to say the mirror in the present example, the main shaft is rotated to the desired position so that the laser output beam is received by the mirror and reflected in precisely the desired direction. The indexing arm to control this position is then adjusted to receive in its recess the locking pin of its associated plunger. The plunger is then actuated to lock the indexing arm in position. The indexing arm is then locked to the main shaft. Thereafter, the mirror will always be precisely returned to this position when the servo-motor is actuated to bring the recess of the indexing arm opposite its associated locking pin.

This procedure is carried out for each of the positions to which the mirror or main shaft is to be indexed, there being as noted hereinabove, an indexing arm and associated apparatus for each such position.

Any suitable and conventional means may be provided in conventional manner to selectably actuate and control the driving servo-motor to cause it to rotate the main shaft to a desired operative radial position. This will, of course, bring the tip of the appropriate indexing arm to approximately the desired operative position whereby the hemispherically-shaped tip of the appropriate plunger is aligned to enter its associated indexing arm recess. When the appropriate indexing arm has reached approximately its operative position as noted above, its plunger is actuated to cause its hemispherical tip to enter the recess of the indexing arm and thereby cause it to be moved by the amount necessary to move it, and, hence, the mirror to precisely the desired operative position.

To insure that the laser beam is not misdirected, the laser power control circuitry is disabled unless, for each indexed position, there has been received by an and gate or the like implemented using conventional electronic circuitry or, alternately, programmable controller software the servo-motor signal indicating it has been actuated, the main shaft signal indicating that the main shaft has been rotated, and the two plunger signals indicating that the correct plunger has been actuated and that its pin is in the recess of the indexing arm.

As shown in FIG. 4, the above-described failsafe circuitry may comprise a conventional and gate 51 for receiving an output signal from the servo-motor potentiometer 27, the main shaft potentiometer 44, and the proximity switch 41. When all three output signals have been received by the and gate 51, it is actuated and supplies an output signal to the laser power control circuitry. As previously explained, the laser power control circuitry is disabled and prevents the generation of an output laser beam until the and gate output signal is received thereby indicating that the laser beam directing mirror has been indexed precisely to a predetermined desired position and has been locked in that position.

It is to be understood that other equivalent circuitry may be substituted for and/or implement the and gate. Alternately, the laser power control circuitry may be programmably controlled wherein the output signals of the potentiometers and switch are processed by the power control circuitry to permit actuation of the laser when, inter alia, the directing mirror has been indexed to and locked in a predetermined desired position.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

What is claimed is:

1. Indexing apparatus for circumferentially indexing a rotary shaft to a plurality of predetermined operative radial positions comprising:
   (a) a support table;
   (b) a bearing member carried by said table;
   (c) a main shaft rotatably journaled and supported in said bearing member and having first and second end portions extending in opposite directions through said table and said bearing member;

(d) a plurality of radially extending arms each circumferentially adjustable carried one above another on the first end portion of said main shaft, each arm having a recess at its end remote from said shaft;

(e) gripping means carried by each arm for securing each of said arms to said shaft at a different one of said predetermined radial operative positions;

(f) driving means carried by said table and coupled to said shaft for selectably rotating said shaft to approximately any one of said plurality of predetermined operative radial positions; and (g) locking means carried by said table and associated with each of said arms for separately engaging the recess of each of said arms when in their approximate radial operative position, each said locking means upon engaging its associated arm moving said arm and locking it in its said predetermined operative position upon its having been rotated to its approximate predetermined operative position by said driving means.

2. Apparatus as defined in claim 1 wherein said recesses are generally conical in shape and said locking means each include a hemispherically-shaped end piece which engages said recesses, said end pieces being of a size to fit within said recesses.

3. Apparatus as defined in claim 2 wherein each said locking means further includes plunger means having an extreme tip movable toward and away from said shaft and having said hemispherically-shaped end piece disposed at said extreme tip, said plunger means being disposed one above another.

4. Apparatus as defined in claim 3 wherein each of said plunger means are disposed opposite a different one of said arms when said arm has been rotated to its approximate predetermined operative position whereby movement of said extreme tip toward said shaft causes said end piece to enter the recess of said arm.

5. Apparatus as defined in claim 4 and further including:

(a) first potentiometer means for providing an output signal when said driving means has been actuated to rotate said shaft;

(b) second potentiometer means for providing an output signal when said shaft has been rotated by said driving means; and (c) switching means carried by each of said locking means for providing an output signal when the end piece of said locking means enters a recess.

6. Apparatus as defined in claim 5 and further including:

(a) a laser beam directing mirror fixedly attached to the second end portion of said shaft for receiving the output laser beam of a laser having laser power control circuitry having an on and an off condition for controlling the generation of said output laser beam; and (b) means for receiving said first and second potentiometer means output signals and said switching means output signal and actuating said laser power control circuitry to its on condition only when all of said output signals have been received.

7. Indexing apparatus for circumferentially indexing to a plurality of predetermined operative radial positions laser beam directing mirror for receiving an output laser beam from a laser and directing the laser beam to different optical systems which direct a received laser beam to different work stations, comprising:

(a) a support table;

(b) a bearing member carried by said table;

(c) a main shaft rotatably journaled and supported in said bearing member and having first and second end portions extending in opposite directions through said table and said bearing member;

(d) a plurality of radially extending arms each circumferentially adjustable carried one above another on the first end portion of said main shaft, each arm having a recess at its end remote from said shaft;

(e) gripping means carried by each arm for securing each of said arms to said shaft at a different one of said predetermined radial operative positions;

(f) driving means carried by said table and coupled to said shaft for selectably rotating said shaft to approximately any one of said plurality of predetermined operative radial positions;

(g) locking means carried by said table and associated with each of said arms for separately engaging the recess of each of said arms when in their approximate radial operative position, each said locking means upon engaging its associated arm moving said arm and locking it in its said predetermined operative position upon its having been rotated to its approximate predetermined operative position by said driving means;

(h) laser power control circuitry means for actuating said laser to produce said output laser beam;

(i) first potentiometer means for providing an output signal when said driving means has been actuated to rotate said shaft;

(j) second potentiometer means for providing an output signal when said shaft has been rotated by said driving means;

(k) switching means carried by each of said locking means for providing an output signal when the end piece of said locking means enters a recess; and (l) means for receiving said first and second potentiometer means output signals and said switching means output signal and actuating said laser power control circuitry means to produce said output laser beam only when all of said output signals have been received.

* * * * *